US010694567B1

(12) United States Patent
 Laberge et al.

(10) Patent No.: US 10,694,567 B1
(45) Date of Patent: Jun. 23, 2020

(54) SYSTEMS AND METHODS FOR ESTABLISHING A DATA CONNECTION

(71) Applicant: Bose Corporation, Framingham, MA (US)

(72) Inventors: Francois Laberge, Wellesley, MA (US); Nathan A. Blagrove, Wayland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/403,962

(22) Filed: May 6, 2019

(51) Int. Cl.
*H04W 76/14* (2018.01)
*H04W 4/02* (2018.01)
*G06T 7/73* (2017.01)
*H04N 5/232* (2006.01)

(52) U.S. Cl.
CPC ............... *H04W 76/14* (2018.02); *G06T 7/74* (2017.01); *H04N 5/23229* (2013.01); *H04W 4/026* (2013.01)

(58) Field of Classification Search
CPC ............................ H04W 76/14; H04W 76/026
See application file for complete search history.

(56) References Cited

U.S. PATENT DOCUMENTS

| 2016/0086582 | A1* | 3/2016 | Hu | G06F 3/147 345/1.3 |
| 2016/0292780 | A1* | 10/2016 | Ren | G06K 9/46 |

* cited by examiner

*Primary Examiner* — Hsinchun Liao
(74) *Attorney, Agent, or Firm* — Bond, Schoeneck & King, PLLC

(57) ABSTRACT

Systems and methods for establishing a data connection, including a first device having a display screen to display a first image and a portable electronic device including a camera and circuitry to obtain a first characteristic of the first device or the first image via a communication; capture a captured image of the display screen of the first device; analyze the captured image to obtain a captured image characteristic; compare the captured image characteristic with the first characteristic; and, establish a connection between the first device and the portable electronic device if the captured image characteristic and the first characteristic are within a predetermined threshold. Once a connection is established, the portable electronic device is configured to continuously obtain the location, position, orientation, and/or movement of the first device and utilize this information in various applications used by the first device and/or portable electronic device.

23 Claims, 6 Drawing Sheets

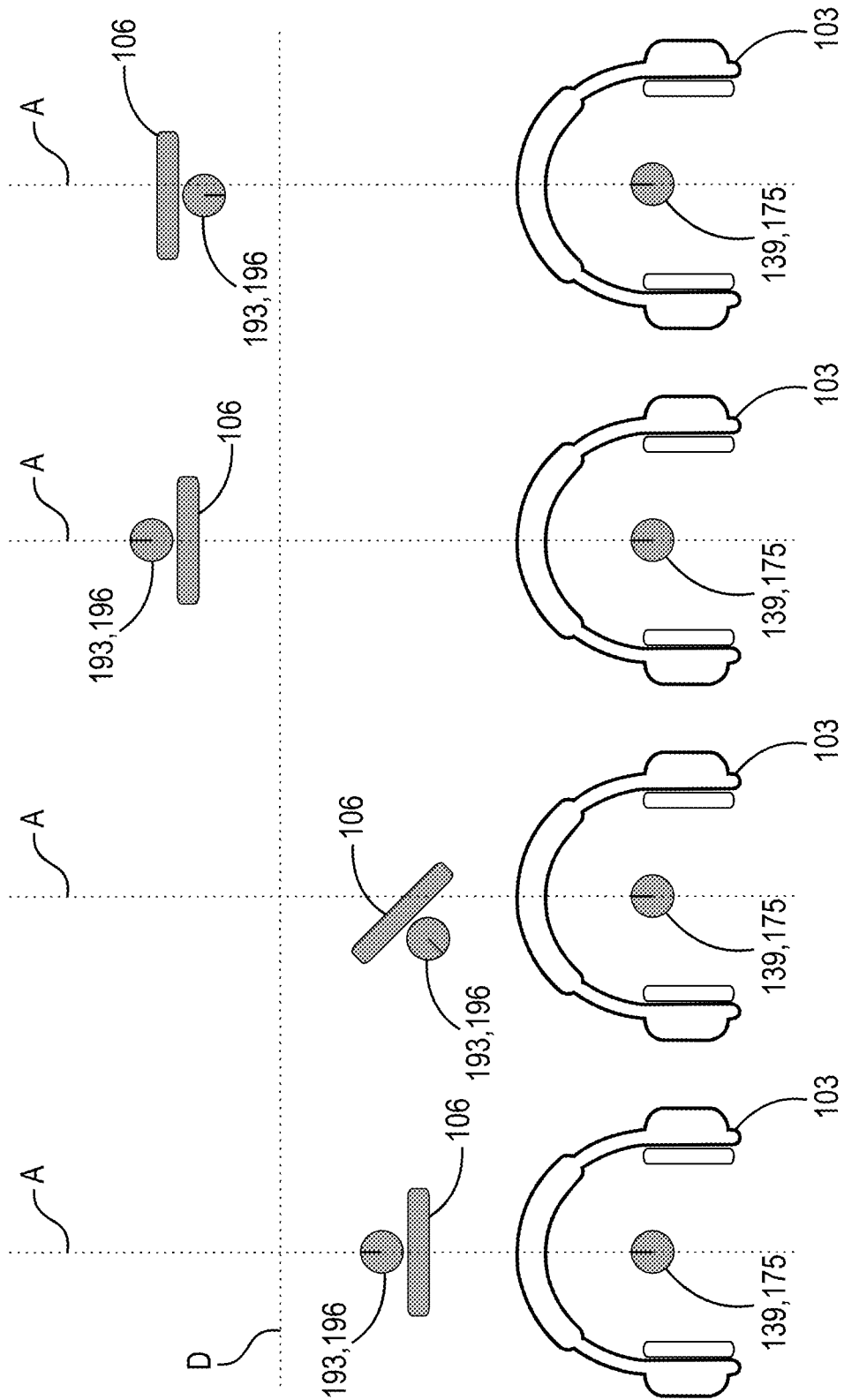

SYSTEMS AND METHODS FOR ESTABLISHING A DATA CONNECTION

BACKGROUND

The present disclosure related generally to wireless systems, specifically, wireless audio and/or video systems and establishing wireless connections between devices.

SUMMARY OF THE DISCLOSURE

The present disclosure relates to systems and methods for establishing a wireless connection between a first device and a portable electronic device. The first device is arranged to broadcast a first communication over a wireless protocol containing information relating to the first device and to e.g., display a first image or indicator, and the portable electronic device, via a camera, is arranged to capture an image of the first image or indicator. The portable electronic device is then arranged to receive the first communication and analyze the captured image and determine whether the portable electronic device is facing the first device. If the two devices are facing, a more robust wireless connection can be made. Once a more robust connection is made, the portable electronic device is configured to continuously obtain the location, position, orientation, and/or movement of the first device and utilize this information in various applications used by the first device and/or portable electronic device.

In one aspect, a system for establishing a wireless connection is provided, the system including a first device comprising a first communication module arranged to send a first communication, and a portable electronic device. The portable electronic device includes a camera and circuitry. The circuitry is arranged to: obtain a first characteristic of the first device from the first communication; capture, using the camera, a captured image of at least a portion of the first device; analyze the captured image to obtain at least one captured image characteristic; compare the captured image characteristic with the first characteristic; and, establish a first connection between the first device and the portable electronic device if the captured image characteristic and the first characteristic are within a predetermined threshold.

In an aspect, the first device further comprises a body, the body having a first indicator arranged thereon.

In an aspect, the indicator is selected from: a light source, a UPC barcode, a matrix barcode, or a Quick Response (QR) code.

In an aspect, the first characteristic is information obtained from the first indicator.

In an aspect, the first device further comprises a display screen arranged to display a first image.

In an aspect, the first characteristic is selected from: the first device's location with respect to a predefined reference point or the first device's location with respect to the portable electronic device.

In an aspect, the first characteristic is selected from: the first device's size; the size of a display of a display screen of the first device; or the first device's shape.

In an aspect, the first characteristic is selected from: the first device's Universal Unique Identifier (UUID) or the first device's Service Set Identifier (SSID).

In an aspect, the first characteristic is selected from: an average luminance of a display screen of the first device displaying a first image; feature point recognition data corresponding to the first image displayed on the display screen of the first device; a color signature of at least a portion of the first image; or a refresh rate of the display screen.

In an aspect, the first characteristic is an orientation of the camera with respect to a display screen of the first device.

In an aspect, a system for establishing a wireless connection is provided, the system including a first device having a display screen, the display screen arranged to display a first image, a first communication module arranged to send a first communication and a second communication, and a portable electronic device. The portable electronic device including a camera and circuitry, where the circuitry is arranged to: obtain the first communication from the first device; send a confirmation signal to the first device that the first communication was received; receive the second communication from the first device; obtain a first characteristic of the first device or the first image via the second communication; capture, using the camera, a captured image of at least a portion of the display screen of the first device; analyze the captured image to obtain a captured image characteristic; compare the captured image characteristic with the first characteristic; and, establish a first connection between the first device and the portable electronic device if the captured image characteristic and the first characteristic are within a predetermined threshold.

In an aspect, the first characteristic is selected from: the first device's location with respect to a predefined reference point or the first device's location with respect to the portable electronic device.

In an aspect, the first characteristic is selected from: the first device's size; the size of the display of the display screen of the first device; or the first device's shape.

In an aspect, the first characteristic is selected from: the first device's Universal Unique Identifier (UUID) or the first device's Service Set Identifier (SSID).

In an aspect, the first characteristic is selected from: an average luminance of the display screen of the first device displaying a first image; feature point recognition data corresponding to the first image displayed on the display screen of the first device; a color signature of at least a portion of the first image; or a refresh rate of the display screen.

In an aspect, the first characteristic is an orientation of the camera with respect to the display screen of the first device.

In an aspect, a method for establishing a wireless connection is provided, the method including: receiving, from a first device having a display screen arranged to display a first image, and a first communication from a first communication module, wherein the first communication comprises a first characteristic; sending, from a portable electronic device, the portable electronic device having a camera, a confirmation signal; receiving, from the circuitry of the portable electronic device, a second communication; capturing, using the camera of the portable electronic device, a captured image of at least a portion of the display screen of the first device; analyzing the captured image to obtain a captured image characteristic; comparing the captured image characteristic with the first characteristic; and, establishing a first connection between the first device and the portable electronic device if the captured image characteristic and the first characteristic are within a predetermined threshold.

In an aspect, the first characteristic is selected from: the first device's location with respect to a predefined reference point or the first device's location with respect to the portable electronic device.

In an aspect, the first characteristic is selected from: the first device's size; the size of the display of the display screen of the first device; or the first device's shape.

In an aspect, the first characteristic is selected from: the first device's Universal Unique Identifier (UUID) or the first device's Service Set Identifier (SSID).

In an aspect, the first characteristic is selected from: an average luminance of the display screen of the first device displaying a first image; feature point recognition data corresponding to the first image displayed on the display screen of the first device; a color signature of at least a portion of the first image; or a refresh rate of the display screen.

In an aspect, the first characteristic is an orientation of the camera with respect to the display screen of the first device.

In an aspect, a system for establishing a wireless connection, the system including a first device comprising a first communication module arranged to send a first communication and a first sensor arranged to determine a first orientation of the first device, and, a portable electronic device. The portable electronic device including a second sensor arranged to determine a second orientation of the portable electronic device, and circuitry arranged to: determine a first distance between the first device and the portable electronic device; and, determine, from the first orientation and the second orientation, whether the portable electronic device is directed at the first device; and, establish a first connection between the first device and the portable electronic device if the circuitry determines that the first distance exceeds a predetermined distance, and the circuitry determines that the first portable electronic device is directed at the first device.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 4A is a schematic view of a system according to the present disclosure.

FIG. 4B is a schematic view of a system according to the present disclosure.

FIG. 4C is a schematic view of a system according to the present disclosure.

FIG. 4D is a schematic view of a system according to the present disclosure.

DETAILED DESCRIPTION OF EMBODIMENTS

The present disclosure relates to systems and methods for establishing a wireless connection between a first device and a portable electronic device. The first device is arranged to broadcast a first communication over a wireless protocol containing information relating to the first device and to e.g., display a first image or indicator, and the portable electronic device, via a camera, is arranged to capture an image of the first image or indicator. The portable electronic device is then arranged to receive the first communication and analyze the captured image and determine whether the portable electronic device is facing the first device. If the two devices are facing, a more robust wireless connection can be made. Once a more robust connection is made, the portable electronic device is configured to continuously obtain the location, position, orientation, and/or movement of the first device and utilize this information in various applications used by the first device and/or portable electronic device. For example, as will be described below, once the first device and the portable electronic devices have established a connection, the devices can be arranged to determine or estimate each other's position relative to each other or relative to a predetermined point in space. The devices' locations or positions can be continuously estimated so that each device continuously knows where the other device is. In one example, applications like augmented reality application may use this information to enhance the augmented reality experience by changing various characteristics of the data sent and received between the two devices to conform with a more realistic experience.

Figure 2:
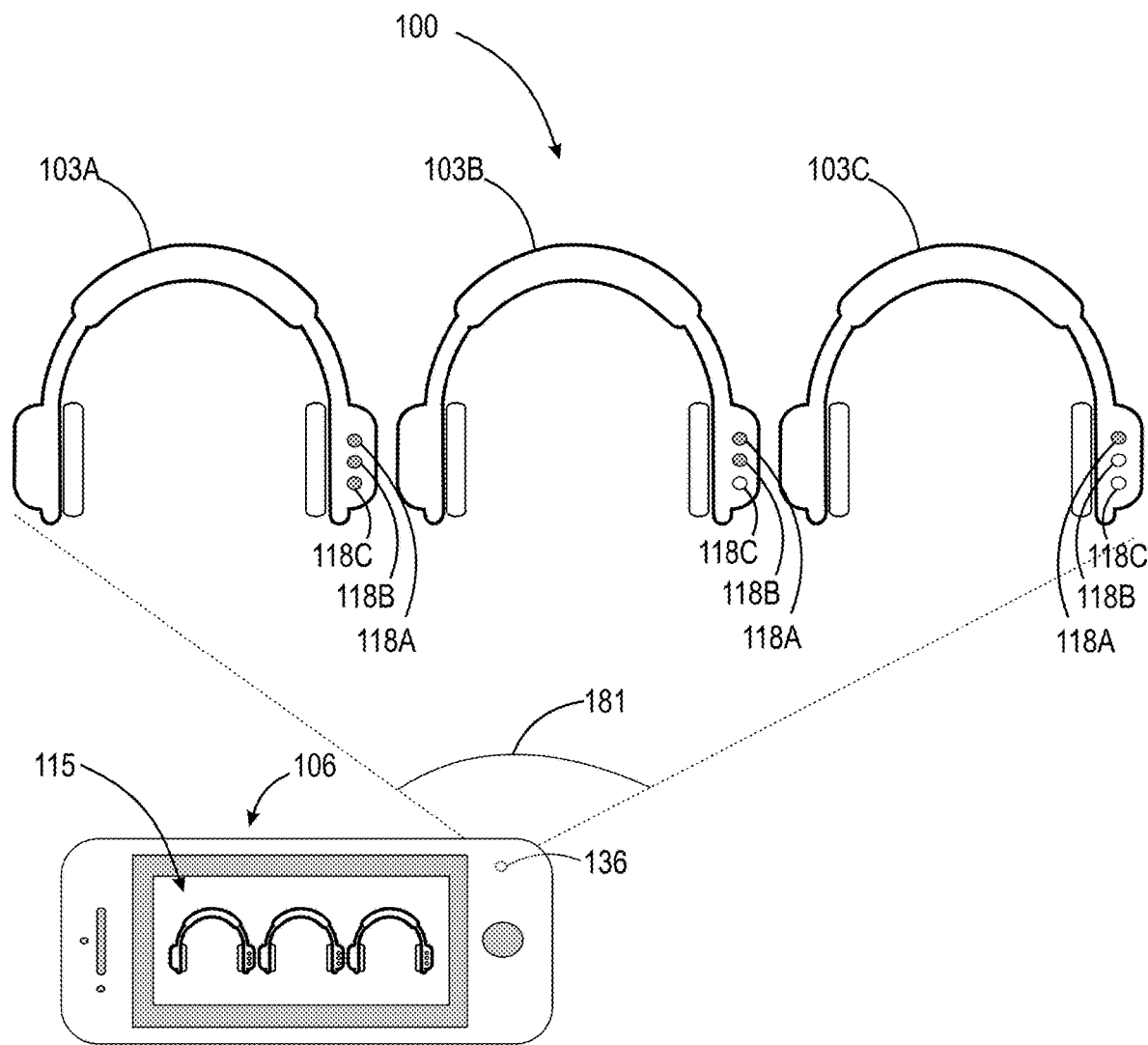
FIG. 2 is a schematic view of a system according to the present disclosure.
Figure 3:
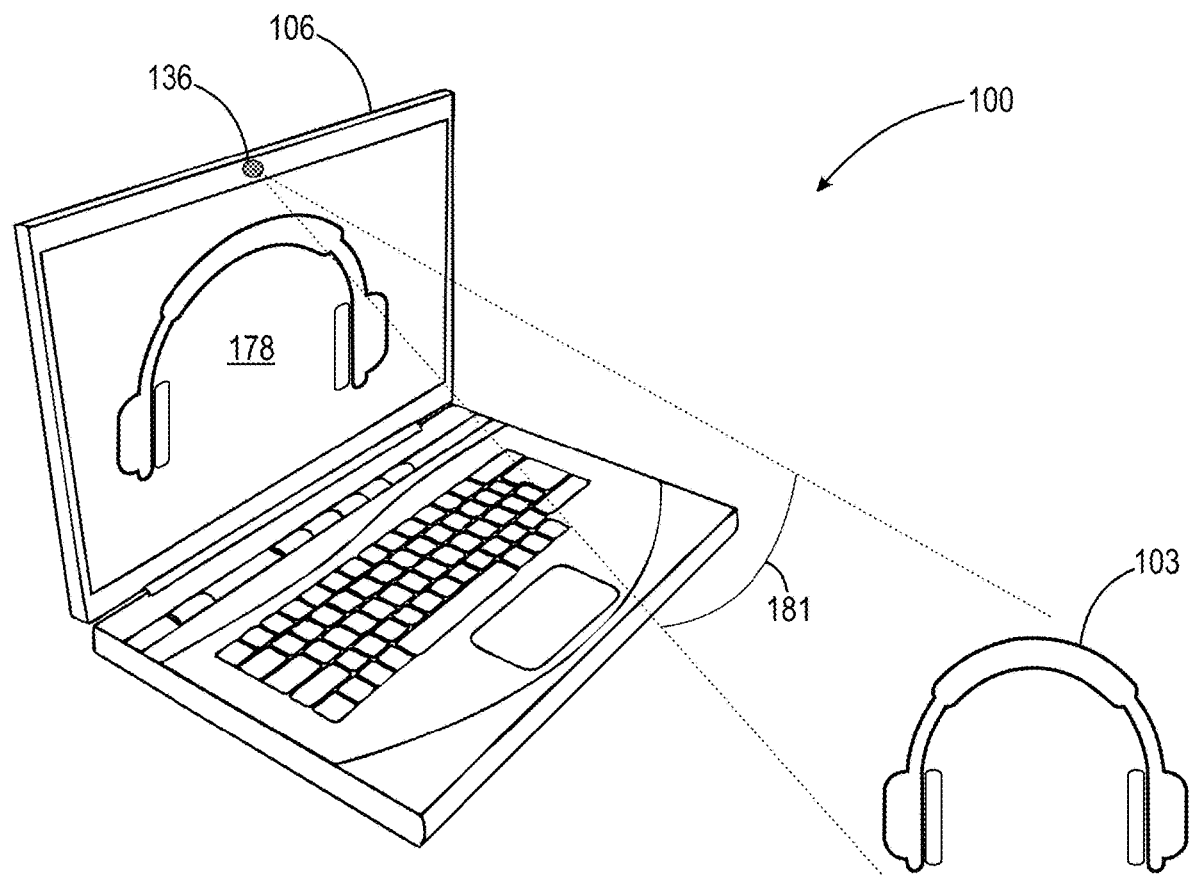
FIG. 3 is a schematic view of a system according to the present disclosure.

The term "wearable audio device," as used in this application, is intended to mean a device that fits around, on, in, or near an ear and that radiates acoustic energy into or towards the ear canal. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 2 shows examples of an around-ear headset, in other examples the headset may be an in-ear, on-ear, or near-ear headset. In some examples, a wearable audio device may be an open-ear device that includes an acoustic driver to radiate acoustic energy towards the ear canal while leaving the ear open to its environment and surroundings.

Figure 1:
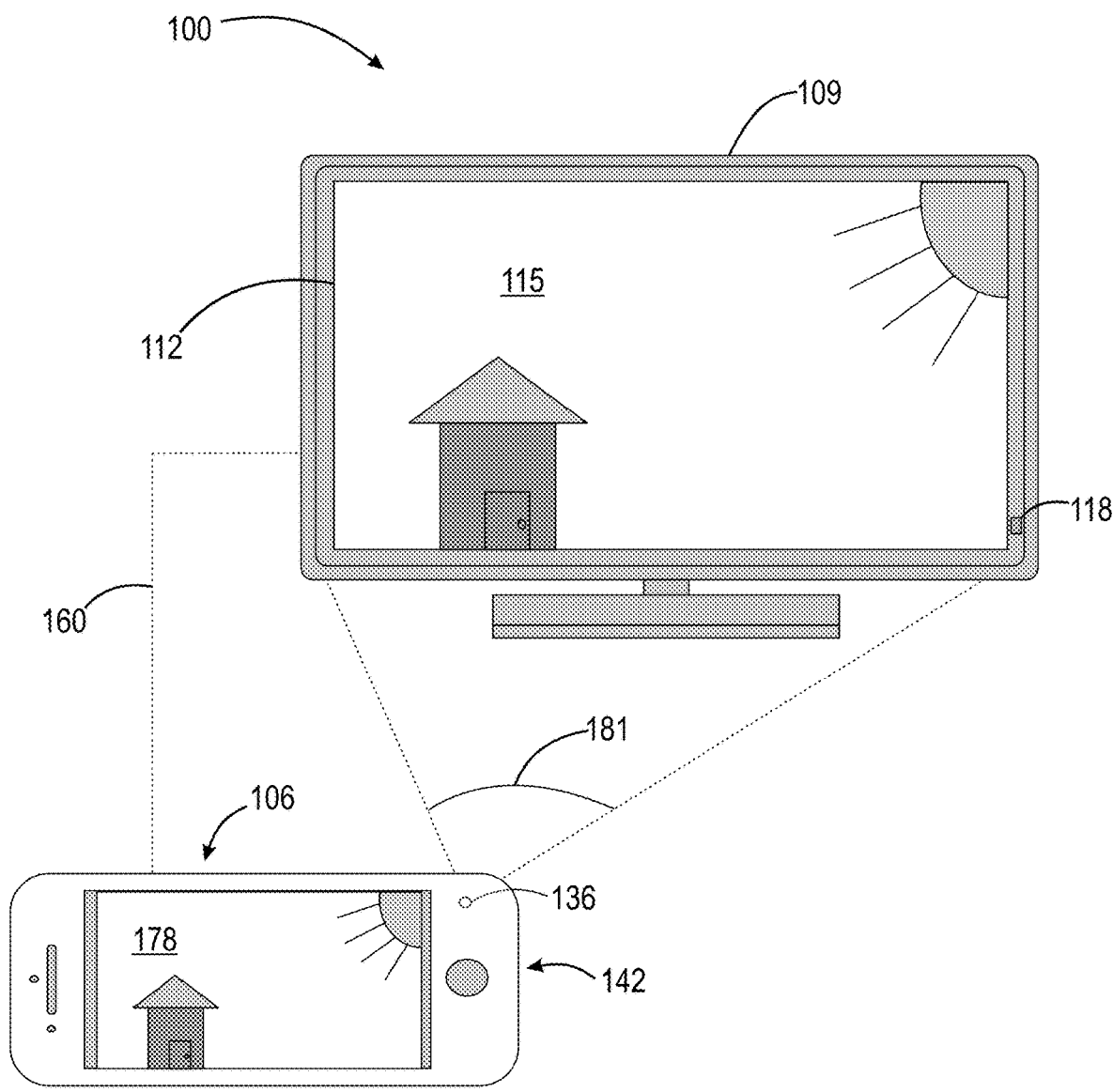
FIG. 1 is a schematic view of a system according to the present disclosure.

Referring now to the figures, FIG. 1 is a schematic view of system 100 according to the present disclosure. As illustrated in FIG. 1, system 100 can include first device 103 and portable electronic device 106. First device 103 may include a body, i.e., body 109 having a display screen 112 arranged to display first image 115. Additionally, body 109 can further include an indicator, i.e., first indicator 118. First indicator 118 can be selected from: a light source (e.g., a Light-Emitting Diode (LED), Organic Light-Emitting Diode (OLED), or a Polymer Light-Emitting Diode (PLED)) a UPC barcode displayed on a portion of body 109 or display screen 112, a matrix barcode displayed on a portion of body 109 or display screen 112, a Quick Response (QR) code displayed on a portion of body 109 and/or displayed screen 112, or any other visual indicator which can uniquely distinguish first device 103 from any other device within a field of view 181 of camera 136 of portable electronic device 106 as discussed below.

Although illustrated in FIG. 1 as a television, it should be appreciated that first device 103 can be selected from any electronic device capable of displaying first image 115 and/or displaying first indicator 118, e.g., a smart phone, a tablet, a laptop or personal computer, a wearable audio device (e.g., a headphone as shown in FIG. 2), etc. Within body 109, first device 103 further includes first processor 121 (shown in FIG. 5A) and first memory 124 (shown in FIG. 5A) arranged to execute and store, respectively, first set of non-transitory computer-readable instructions 127 (shown in FIG. 5A). Furthermore, body 109 further includes first communication module 130 (shown in FIG. 5A), operatively connected to first processor 121 and first memory 124. First communication module 130 includes first antenna 133 (shown in FIG. 5A) arranged to send and/or receive wireless communications (e.g., first communication 166 and second communication 169, discussed below).

Figure 5A:
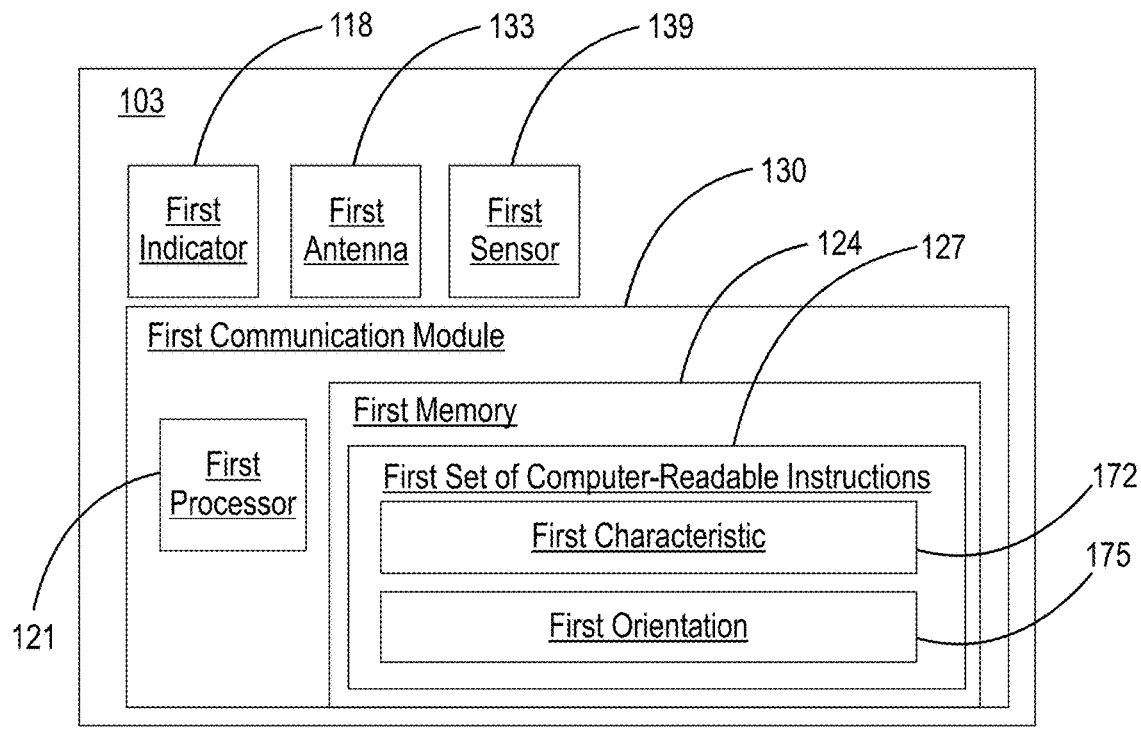
FIG. 5A is a schematic view of the electronic components of a first device according to the present disclosure.
Figure 5B:
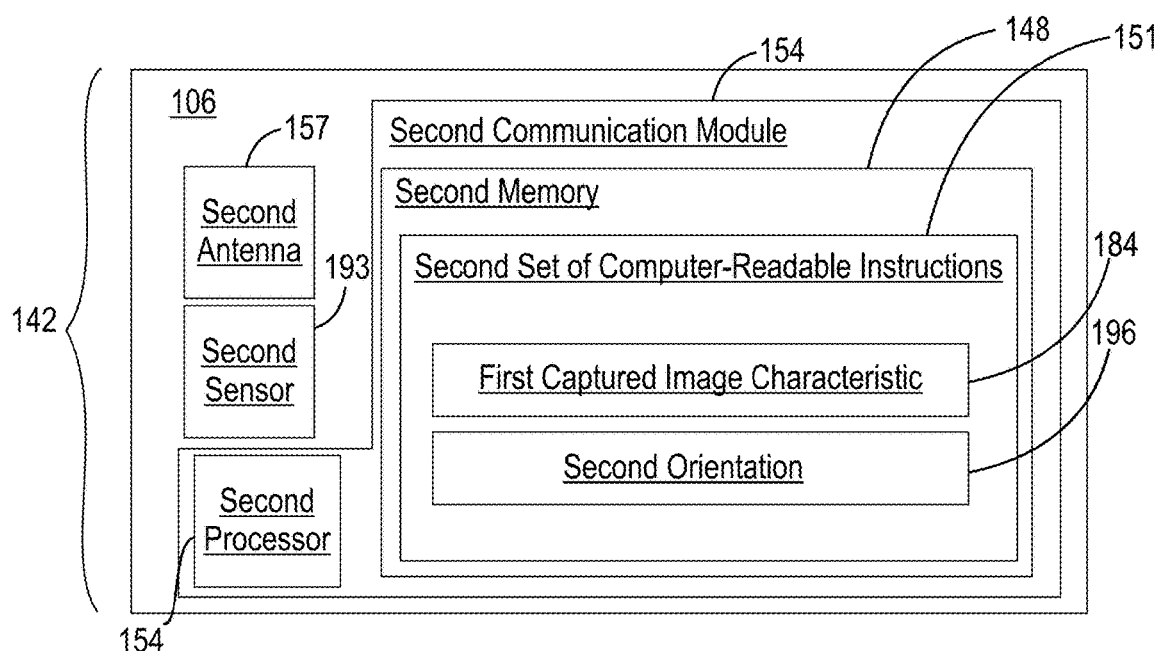
FIG. 5B is a schematic view of the electronic components of circuitry of a portable electronic device according to the present disclosure.

Portable electronic device 106 includes camera 136, sensor 139 (shown in FIG. 5A), and circuitry 142 (also shown in FIG. 5B). Camera 136 is arranged to capture first captured image 178 discussed below. It should be appreciated that camera 136 is intended to be a digital camera arranged on the body of portable electronic device 106; however, it should be appreciated that camera 136 can be located externally from portable electronic device 106 and connected to portable electronic device 106 via any of the wireless or wired protocols discussed herein. Additionally, although illustrated on the back side of portable electronic device 106, it should be appreciated that camera 136 can be arranged anywhere on portable electronic device 106. Furthermore, although illustrated in FIG. 1 as a smart phone, it should be appreciated that portable electronic device 106 can be any device having a camera that is capable of capturing and analyzing first captured image 178, discussed below. Sensor 139 (shown in FIG. 5A) is intended to be a motion and/or orientation sensor, e.g., a gyroscope, an accelerometer, a magnetometer, or any combination thereof. Sensor 139 is further intended to receive position, movement, or orientation data which can be sent and/or received over first protocol 163 (not shown) of first connection 160 (discussed below) from portable electronic device 106 to first device 103. Circuitry 142 of portable electronic device 106 further includes second processor 145 (shown in FIG. 5B) and second memory 148 (shown in FIG. 5B) arranged to execute and store, respectively, second set of non-transitory computer-readable instructions 151 (shown in FIG. 5B). Furthermore, circuitry 142 further includes second communication module 154 (shown in FIG. 5B), operatively connected to second processor 145 and second memory 148. Second communication module 154 includes second antenna 157 (shown in FIG. 5B) arranged to send and/or receive wireless communications (e.g., first communication 166 and second communication 169, discussed below).

The following description should be read in view of FIGS. 1-5B. During operation of system 100, first device 103 or portable electronic device 106 is arranged to establish a first connection, i.e., first connection 160. For example, first antenna 133 of first communication module 130 may initiate/request a first connection 160 with portable electronic device 106 where the request is received and accepted via second antenna 157 of second communication module 154. Conversely, second antenna 157 of second communication module 154 may initiate/request first connection 160 with first device 103 where the request is received an accepted via first antenna 133 of first communication module 130. In one example, first connection 160 is a wireless connection established between first communication module 130 and second communication module 154 using a wireless protocol, i.e., first protocol 163. It should be appreciated that first protocol 163 can be selected from: a Bluetooth protocol, a Bluetooth Low-Energy (BLE) protocol, a ZigBee protocol, a Wi-Fi (IEEE 802.11) protocol, or any other protocol for establishing a wireless connection between first device 103 and portable electronic device 106. It should further be appreciated that first connection 160 may be a physical connection made between first device 103 and portable electronic device 106, e.g., via a cable or cord arranged to send and/or receive data between first device 103 and portable electronic device 106.

In one example, first communication module 130 and second communication module 154 are arranged to send and/or receive first communication 166. First communication 166 can be sent and/or received over first protocol 160. In one example, first device 103 is a smart television and first device 103 is arranged to broadcast, using first communication module 130, first communication 166. In this example, first communication 166 is made over a BLE protocol, where first communication 166 contains advertising data, i.e., packets data contained in a BLE protocol sent over an advertising channel of the BLE protocol where at least a portion of the advertising data broadcasted by first device 103 contains a first characteristic, i.e., first characteristic 172. First characteristic 172 can be selected from: information related to whether first indicator 118 is active or inactive; first device 103's location with respect to a predefined reference point or first device 103's location with respect to portable electronic device 106; first device 103's size; a size of display screen 112 of first device 103; first device 103's shape; first device 103's Universal Unique Identifier (UUID); first device 103's Service Set Identifier (SSID); an average luminance of display screen 112; feature point recognition data corresponding to first image 115 displayed on display screen 112 of the first device 103; a color signature of at least a portion of the first image 115; a refresh rate of display screen 112; or, an orientation, i.e., first orientation 175 of the camera 136 with respect to display screen 112 of first device 103.

Second communication module 154 of portable electronic device 106 is arranged to receive first communication 166 from first device 103 over first protocol 163 (e.g., BLE), where first communication 166 contains first characteristic 172 of first device 103. First characteristic 172 is stored in second memory 148 of portable electronic device 106. Camera 136 of portable electronic device 106 is arranged to capture an image, i.e., first captured image 178, within field of view 181 of camera 136. In one example, first device 103 is within field of view 181 of camera 181 and therefore, at least a portion of first device 103 is within first captured image 178.

Circuitry 142, via second processor 145 and second memory 148 is arranged to analyze first captured image 178 and determine a characteristic of the captured image, i.e., first captured image characteristic 184. Analyzing can include the execution of known algorithms related to digital image processing techniques including, e.g., classification, feature extraction, multi-scale signal analysis, pattern recognition, projection, linear filtering, pixilation, principal component analysis, etc. First captured image characteristic can be selected from: information related to whether first indicator 118 is active or inactive; first device 103's location with respect to a predefined reference point or first device 103's location with respect to portable electronic device 106; first device 103's size; a size of display screen 112 of first device 103; first device 103's shape; first device 103's Universal Unique Identifier (UUID); first device 103's Service Set Identifier (SSID); an average luminance of display screen 112; feature point recognition data corresponding to first image 115 displayed on display screen 112 of the first device 103; a color signature of at least a portion of the first image 115; a refresh rate of display screen 112; or, an orientation, i.e., first orientation 175 of the camera 136 with respect to display screen 112 of first device 103.

After obtaining first captured image characteristic 184, circuitry 142 is further arranged to compare first characteristic 172 with first captured image characteristic 184. If, after comparison, first characteristic 172 and first captured image characteristic 184 are within a predetermined threshold, i.e., predetermined threshold 187, circuitry 146 is arranged to establish a more robust data connection, i.e., first connection 160. Predefined threshold 187 can be a qualitative or quantitative determination which depends on the type of characteristic being compared. For example, if first characteristic and the captured image characteristic correspond to the location of first device 103, predetermined threshold 187 may allow for a deviation or error in the determined position of up to but not exceeding 1 ft. Alternatively, if first characteristic and first captured image characteristic correspond with a luminance level of display screen 112 of first device 103, predetermined threshold 187 may allow for deviation or error in the determined luminance of display screen 112 of up to but not exceeding 5 lux. Furthermore, if first characteristic and first captured image characteristic correspond with an orientation of camera 136 with respect to first device 103, predetermined threshold 187 may allow for a deviation or error in the determined orientation by 5-10 degrees. Each type of characteristic may correspond to a predetermined threshold, where the predetermined threshold is relatively small, such that two devices can easily be distinguished. In an example embodiment first connection 166 utilizes a more robust protocol, e.g., standard Bluetooth protocols (also known as Bluetooth Classic) so that larger amounts of data may be transferred between first device 103 and portable electronic device 106.

In short, first device 103 is arranged to send a characteristic, i.e., first characteristic 172, which is a characteristic corresponding to an inherent characteristic or quality of first device 103 and/or first image 115 which can aid in the visual identification of first device, to portable electronic device 106 over a first protocol, e.g., BLE. Portable electronic device 106, is arranged to receive and store first characteristic 172, and capture an image, i.e., first captured image 178 including at least a portion of first device 103 and/or first image 115, via camera 136. Circuitry 142 of portable electronic device 106 is further arranged to analyze first captured image 178 to obtain a first captured image characteristic 184, and compare first characteristic 172 with first captured image characteristic 184. If first characteristic 172 and first captured image characteristic are within a predefined threshold, i.e., predefined threshold 187 specific to the type of characteristics utilized, a more robust connection between first device 103 and portable electronic device 106 is made, i.e., first connection 160.

In one example, first communication module 130 and second communication module 154 are arranged to send and/or receive first communication 166 and second communication 169. First communication 166 and second communication 169 can be sent and/or received over first protocol 160. In one example, first device 103 is a smart television and first device 103 is arranged to broadcast, using first communication module 130, first communication 166. In this example, first communication 166 is made over a BLE protocol, where first communication 166 contains advertising data, i.e., packets of data contained in a BLE protocol sent over an advertising channel of the BLE protocol where at least a portion of the advertising data broadcasted by first device 103 contains information about first device 103. This information is intended to be general information about the physical attributes of the device and/or data associated with the type of device, e.g., whether the device is a television, set of headphones, smart speaker, etc. For example, the information can include: first device 103's size; a size of display screen 112 of first device 103; first device 103's shape; first device 103's Universal Unique Identifier (UUID); or first device 103's Service Set Identifier (SSID).

Second communication module 154 of portable electronic device 106 is arranged to receive first communication 166 from first device 103 over first protocol 163 (e.g., BLE), where first communication 166 contains the information associated with first device 103 (discussed above). Upon receiving first communication 166, second communication module 154 is arranged to send a response communication, i.e., confirmation signal 190 back to first device 103, confirming that first communication 166 was received and that more information is desired. Upon receiving confirmation signal 190, first communication module is arranged to send second communication 169 which includes first characteristic 172. Here, as some information has already been exchanged via first communication 166, first characteristic 172 is intended to be more specific information about what first device is doing, i.e., meta data associated with the real-time data used by first device 103. For example, first characteristic 172 can be selected from: whether first indicator 118 is active or inactive; first device 103's location with respect to a predefined reference point or first device 103's location with respect to portable electronic device 106; an average luminance of display screen 112; feature point recognition data corresponding to first image 115 displayed on display screen 112 of first device 103; a color signature of at least a portion of first image 115; a refresh rate of display screen 112; or, an orientation, i.e., first orientation 175 of the camera 136 with respect to display screen 112 of first device 103.

After receiving second communication 169 containing first characteristic 172, camera 136 of portable electronic device 106 is arranged to capture an image, i.e., first captured image 178, within field of view 181 of camera 136. In one example, first device 103 is within field of view 181 of camera 181 and therefore, at least a portion of first device 103 is within first captured image 178.

Circuitry 142, via second processor 145 and second memory 148 is arranged to analyze first captured image 178 and determine a characteristic of the captured image, i.e., first captured image characteristic 184. Analyzing can include the execution of known algorithms related to digital image processing techniques including, e.g., classification, feature extraction, multi-scale signal analysis, pattern recognition, projection, linear filtering, pixilation, principal component analysis, etc. First captured image characteristic can be selected from: information related to whether first indicator 118 is active or inactive; first device 103's location with respect to a predefined reference point or first device 103's location with respect to portable electronic device 106; first device 103's size; a size of display screen 112 of first device 103; first device 103's shape; first device 103's Universal Unique Identifier (UUID); first device 103's Service Set Identifier (SSID); an average luminance of display screen 112; feature point recognition data corresponding to first image 115 displayed on display screen 112 of the first device 103; a color signature of at least a portion of the first image 115; a refresh rate of display screen 112; or, an orientation, i.e., first orientation 175 of the camera 136 with respect to display screen 112 of first device 103.

After obtaining first captured image characteristic 184, circuitry 142 is further arranged to compare first characteristic 172 with first captured image characteristic 184. If, after comparison, first characteristic 172 and first captured image characteristic 184 are within a predetermined threshold, i.e., predetermined threshold 187, circuitry 146 is arranged to establish a more robust data connection, i.e., first connection 160. Predefined threshold 187 can be a qualitative or quantitative determination which depends on the type of characteristic being compared. For example, if first characteristic and the captured image characteristic correspond to the location of first device 103, predetermined threshold 187 may allow for a deviation or error in the determined position of up to but not exceeding 1 ft. Alternatively, if first characteristic and first captured image characteristic correspond with a luminance level of display screen 112 of first device 103, predetermined threshold 187 may allow for deviation or error in the determined luminance of display screen 112 of up to but not exceeding 5 lux. Furthermore, if first characteristic and first captured image characteristic correspond with an orientation of camera 136 with respect to first device 103, predetermined threshold 187 may allow for a deviation or error in the determined orientation by 5-10 degrees. Each type of characteristic may correspond to a predetermined threshold, where the predetermined threshold is selected such that two devices can easily be distinguished. In an example embodiment first connection 160 utilizes a more robust protocol, e.g., standard Bluetooth protocols (also known as Bluetooth Classic) so that larger amounts of data may be transferred between first device 103 and portable electronic device 106.

In the example discussed above, first device 103 is arranged to send a first communication 166 with general device information such as size or type of first device 103. Upon receiving first communication 166, second communication module 154 is arranged to send confirmation signal 190 back to first device 103. Upon receiving confirmation signal 190, first communication module 130 is arranged to send second communication 169 which includes a meta data corresponding to what first device 103 is doing, i.e., first characteristic 172, which can aid in the visual identification of first device 103, to portable electronic device 106 over a first protocol, e.g., BLE. Portable electronic device 106, is arranged to receive and store first characteristic 172, and capture an image, i.e., first captured image 178 including at least a portion of first device 103 and/or first image 115, via camera 136. Circuitry 142 of portable electronic device 106 is further arranged to analyze first captured image 178 to obtain a first captured image characteristic 184, and compare first characteristic 172 with first captured image characteristic 184. If first characteristic 172 and first captured image characteristic are within a predefined threshold, i.e., predefined threshold 187 specific to the type of characteristics utilized, a more robust connection between first device 103 and portable electronic device 106 is made, i.e., first connection 160.

As illustrated in FIG. 2 and described above, system 100 may include multiple devices, i.e., first device 103A, second device 103B, and/or third device 103C. It should be appreciated that although three separate devices are illustrated, it is contemplated herein more or less devices can be utilized, e.g., two devices or four or more devices. FIG. 2 illustrates that each device 103A-103C can include indicators 118A-118C. In one example, as illustrated in FIG. 2, all three indicators 118-118C of first device 103 are activated, i.e., are emitting light; two indicators 118A-118B of second device 103B are activated; and, only a single indicator 118A of third device 103C is activated. At least one device 103A-103C is arranged to broadcast first communication 166 to portable electronic device 106 where first communication 166 contains a first characteristic, i.e., how many LED's are activated the at least one device 103A-103C. For example, only second device 103B could broadcast first communication 166, where first communication contains first characteristic including data indicating that two indicators 118A-118B are activated.

In this example, all three devices 103A-103C are within field of view 181 of camera 136 and therefore, all three devices are within first captured image 178. Circuitry 142, via second processor 145 and second memory 148 of portable electronic device 106 is arranged to analyze first captured image 178 and determine at least one characteristic of the captured image, i.e., first captured image characteristic 184. Here, first captured image characteristic 184 corresponds with how many LED's are activated on each device 103A-103C. Using the various digital image analyzing techniques described above, portable electronic device 106 can determine how many LED's are activated on each device 103A-103C. Portable electronic device 106 can then compare first characteristic 172 (indicating that two LEDs 118A-118B are activated) with first image characteristic (indicating that device 103B has two LEDs 118A-118B activated). In this example, first characteristic 172 and first captured image characteristic match, i.e., are within a predetermined threshold 187, and thereafter portable electronic device 106 and second device 103B are able to establish first connection 160 and exchange more robust communication data. Although illustrated in FIG. 2 as three separate Light-Emitting Diodes (LEDs) on each device, it should be appreciated that more LEDs or less LEDs are contemplated herein, e.g., two LEDs or four or more LEDs. Additionally, it should be appreciated that a single LED could be utilized on each device where first characteristic corresponds to a particular cadence of pulsing light over a predefined time period; or, a single multi-color LED could be utilized where first characteristic 172 corresponds to a particular color spectral signature of the light produced by the multi-color LED.

As described above, FIG. 3 illustrates portable electronic device 106 as a portable personal computer or laptop having camera 136 having field of view 181 arranged to capture an image of first device 103, where first device 103 takes the form of a wearable audio device.

FIGS. 4A-4D illustrate that first device 103 may include sensor 139, is arranged to obtain e.g., position, motion, and/or orientation data of first device 103. Additionally portable electronic device 106 may contain a similar sensor, i.e., second sensor 193 which can be selected from, e.g., an gyroscope, an accelerometer, a magnetometer or any combination thereof arranged to obtain a position, motion, and/or orientation of portable electronic device 106. In one example, these sensors are magnetometers arranged to determine an orientation of first device 103 and portable electronic device 106, i.e., first orientation 175 and second orientation 196, respectively. First orientation 175 of first device 103 and second orientation 196 of portable electronic device 106 are intended to be an orientation measured within a plane horizontal to the ground beneath the user and with respect to a gravitational force, e.g., earth's constant gravitational field. At least first device 103 is arranged to send, via a first communication module 130, a communication (e.g., first communication 166 or second communication 169) data corresponding to first orientation 175 and, optionally, location data of first device 103. Second communication module 154 of portable electronic device 106 is arranged to receive the data corresponding to first orientation 175 of first device 103. Optionally, portable electronic device 106 may obtain its own location data as well. Portable electronic device 106 may then compare first orientation 175 to second orientation 196 of portable electronic device and first device's location data with the location data of portable electronic device 106. In this example, if first orientation 175 and second orientation 196 are determined to be facing each other, e.g., first orientation 175 is substantially similar, or within a predefined threshold (e.g., within 5-10 degrees) of second orientation 192 first connection 160 may then be established using a more robust protocol, e.g., Bluetooth Classic. Furthermore, portable electronic device 106 can, in addition to determining if first orientation 175 and second orientation 196 are the substantially similar, analyze and compare the location data of first device 103 and portable electronic device 106 to determine if first device 103 is within a predefined distanced D from portable electronic device 106 (e.g., within 15 ft.). If the orientation data analysis and comparison of the orientation data determines that first device 103 and portable electronic device 106 are facing each other, and that both devices are within a predefined distance with respect to each other, the first connection 160 can be established using a more robust protocol, e.g., Bluetooth classic.

FIG. 4A illustrates an example of system 100 where first device 103 and portable electronic device 106 are arranged within predefined distance D (e.g., within 15 ft. of each other). Additionally, as illustrated, first orientation 175 of first device 103 corresponds with first device facing, e.g., magnetic north (if first device 103 is in the northern hemisphere), where magnetic north to south runs along axis A. In this example, second orientation 196 of portable electronic device 106 corresponds with portable electronic device 106 facing away from magnetic north along axis A. Here, as first orientation 175 and second orientation 196 are the similar within a predefined threshold, and first device 103 is within predefined distance D from portable electronic device 106, first connection 160 can be made and established using a more robust communication protocol, e.g., Bluetooth Classic.

FIG. 4B illustrates an example of system 100 where first device 103 and portable electronic device 106 are arranged within predefined distance D (e.g., within 15 ft. of each other). Additionally, as illustrated, first orientation 175 of first device 103 corresponds with first device facing, e.g., magnetic north (if first device 103 is in the northern hemisphere), where magnetic north to south runs along axis A. In this example, second orientation 196 of portable electronic device 106 is offset, e.g., 45-270 degrees from axis A and magnetic north. Here, as first orientation 175 and second orientation 196 are similar within a predefined threshold, e.g., within 5-10 degrees, first connection 160 will not made between first device 103 and portable electronic device 106.

FIG. 4C illustrates an example of system 100 where first device 103 and portable electronic device 106 are arranged outside of predefined distance D. Additionally, as illustrated, first orientation 175 of first device 103 corresponds with first device 103 facing, e.g., magnetic north (if first device 103 is in the northern hemisphere), where magnetic north to south runs along axis A. In this example, second orientation 196 of portable electronic device 106 is the is substantially similar within a predefined threshold to first orientation 175 of first device 103. Although, first orientation 175 and second orientation 196 are substantially similar within a predefined threshold, e.g., within 5-10 degrees, first connection 160 will not made between first device 103 and portable electronic device 106 as first device 103 is not within predefined distance D with respect to portable electronic device 106.

FIG. 4D illustrates an example of system 100 where first device 103 and portable electronic device 106 are arranged outside of predefined distance D. Additionally, as illustrated, first orientation 175 of first device 103 corresponds with first device facing, e.g., magnetic north (if first device 103 is in the northern hemisphere), where magnetic north to south runs along axis A. In this example, second orientation 196 of portable electronic device 106 is arranged opposite, i.e., 180 degrees offset, from first orientation 175 of first device 103. As first orientation 175 and second orientation 196 are not substantially similar within a predefined threshold, e.g., within 5-10 degrees, and first device 103 first connection 160 will not made between first device 103 and portable electronic device 106.

FIG. 5A is a schematic representation of the electronic components of first device 103 as discussed above. FIG. 5B is a schematic representation of the electronic components of circuitry 142, as discussed above.

It should be appreciated that the foregoing mechanisms related to establishing a connection between the first device 103 and the portable electronic device 106 and the methods of determining position/orientation discussed above can be used to continuously estimate the orientation, position, and/or movement of the first device 103 relative to first portable electronic device 106 once the connection has been established. For example, once the comparison between captured image characteristic 184 and first characteristic 172 resolve in a match within a predetermined threshold and the first connection 160 is established, portable electronic device 106 is aware that it is currently viewing first device 103 and is aware of its position/orientation relative to portable electronic device 106. Once portable electronic device 106 knows that it is looking at first device 103, portable electronic device 106 can obtain and continuously track the position, orientation, and/or movement of first device 103 relative to portable electronic device 106. This information, i.e., the position, orientation, and/or movement of first device 103 relative to portable electric device 106 can be used by various programs, e.g. in gaming applications or augmented reality applications to enhance user experience. In one example, portable electronic device 106 is a smart phone capable of displaying a graphical user interface to the user and first device 103 is a television. In this example, once portable electronic device 106 connects with first device 103 via the methods and mechanisms described above, portable electronic device 106 knows the position and/or orientation of first device 103 relative to portable electronic device 106. Once the position and/or orientation of first device 103 is known, the graphical user interface displayed to the user may overlay and/or augment the image of the first device 103 as seen by camera 136 and displayed to the user. In one example, the graphical user interface may display interactive buttons or windows that appear to extend from and hover in space in front of display screen 112 of first device 103 which would allow the user to interact with the graphical user interface as if they were interacting with the interactive buttons or windows in space. In another example, once the position of first device 103 is known to portable electronic device 106, various characteristics of the information streamed within the first connection can be altered as position between the two devices is altered, i.e., volume increases as the distance between portable electronic device 106 and first device 103 decreases or volume decreases as the distance between portable electronic device 106 and first device 103 increases.

Figure 6:
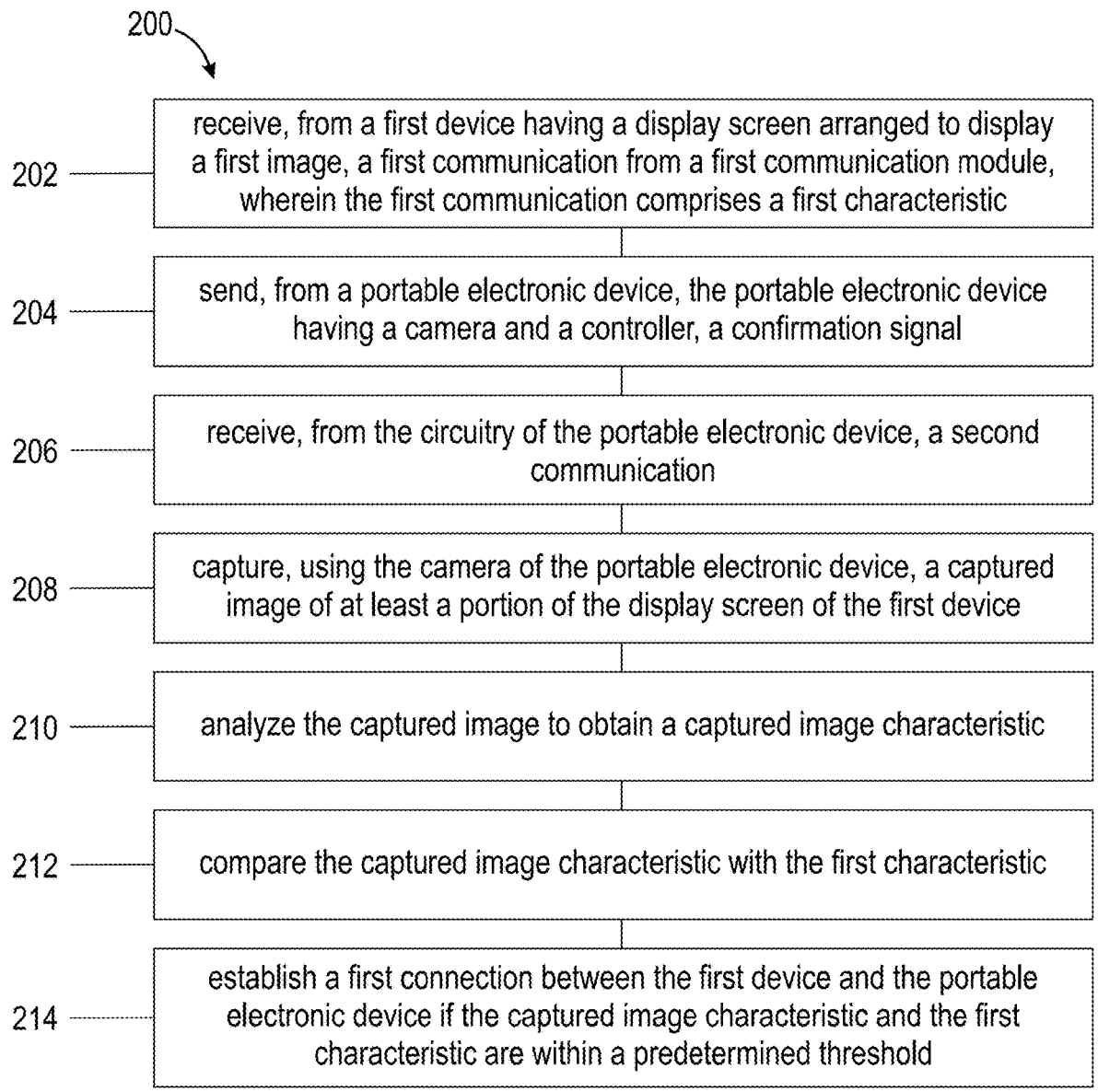
FIG. 6 is a flow chart illustrated the steps of the method according to the present disclosure.

FIG. 6 illustrates the steps of method 200 according to the present disclosure. Method 200 includes: receiving, from first device 103 having display screen 112 arranged to display first image 115, first communication 166 from first communication module 130 (step 202); sending, from portable electronic device 106, portable electronic device 106 having camera 136, a confirmation signal 190 (step 204); receiving, from circuitry 142 of portable electronic device 106, a second communication 169 (step 206); capturing, using camera 136 of the portable electronic device 106, captured image 178 of at least a portion of the display screen 112 of first device 103 (step 208); analyzing the captured image 178 to obtain a captured image characteristic 184 (step 210); comparing the captured image characteristic 184 with the first characteristic 172 (step 212); and, establishing a first connection 160 between the first device 103 and the portable electronic device 106 if the captured image characteristic 184 and the first characteristic 172 are within a predetermined threshold 187 (step 214).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system for establishing a wireless connection comprising:
   a portable electronic device comprising:
   a camera; and,
   circuitry arranged to:
   obtain a first characteristic of a first device from a first communication received from a first communication module of the first device;
   capture, using the camera, a captured image of at least a portion of the first device;
   analyze the captured image to obtain at least one captured image characteristic, the captured image characteristic associated with the first characteristic of the first device;

compare the captured image characteristic with the first characteristic; and, establish a first connection between the first device and the portable electronic device if the captured image characteristic and the first characteristic are within a predetermined threshold.

2. The system of claim 1, wherein after the first connection between the first device and the portable electronic device is established, the portable electronic device is arranged to repeatedly obtain a location, a position, and/or an orientation of the first device.

3. The system of claim 1, wherein the first device further comprises a body, the body having a first indicator arranged thereon.

4. The system of claim 3, wherein the first indicator is selected from: a light source, a UPC barcode, a matrix barcode, or a Quick Response (QR) code.

5. The system of claim 3, wherein the first characteristic is information obtained from the first indicator.

6. The system of claim 1, wherein the first device further comprises a display screen arranged to display a first image.

7. The system of claim 1, wherein the first characteristic is selected from: the first device's location with respect to a predefined reference point or the first device's location with respect to the portable electronic device.

8. The system of claim 1, wherein the first characteristic is selected from: the first device's size; the size of a display of a display screen of the first device; or the first device's shape.

9. The system of claim 1, wherein the first characteristic is selected from: the first device's Universal Unique Identifier (UUID) or the first device's Service Set Identifier (SSID).

10. The system of claim 1, wherein the first characteristic is selected from: an average luminance of a display screen of the first device displaying a first image; feature point recognition data corresponding to the first image displayed on the display screen of the first device; a color signature of at least a portion of the first image; or a refresh rate of the display screen.

11. The system of claim 1, wherein the first characteristic is an orientation of the camera with respect to a display screen of the first device.

12. A system for establishing a wireless connection comprising:
   a portable electronic device comprising:
      a camera;
      circuitry arranged to:
         obtain a first communication and a second communication from a first communication module of a first device, the first device having a display screen arranged to display a first image;
         send a confirmation signal to the first device that the first communication was received;
         receive the second communication from the first device;
         obtain a first characteristic of the first device or the first image via the second communication;
         capture, using the camera, a captured image of at least a portion of the display screen of the first device;
         analyze the captured image to obtain a captured image characteristic, the captured image characteristic associated with the first characteristic of the first device;
         compare the captured image characteristic with the first characteristic; and,
         establish a first connection between the first device and the portable electronic device if the captured image characteristic and the first characteristic are within a predetermined threshold.

13. The system of claim 12, wherein the first characteristic is selected from: the first device's location with respect to a predefined reference point or the first device's location with respect to the portable electronic device.

14. The system of claim 12, wherein the first characteristic is selected from: the first device's size; the size of the display of the display screen of the first device; or the first device's shape.

15. The system of claim 12, wherein the first characteristic is selected from: the first device's Universal Unique Identifier (UUID) or the first device's Service Set Identifier (SSID).

16. The system of claim 12, wherein the first characteristic is selected from: an average luminance of the display screen of the first device displaying a first image; feature point recognition data corresponding to the first image displayed on the display screen of the first device; a color signature of at least a portion of the first image; or a refresh rate of the display screen.

17. The system of claim 12, wherein the first characteristic is an orientation of the camera with respect to the display screen of the first device.

18. A method for establishing a wireless connection comprising:
   receiving, from a first device having a display screen arranged to display a first image and a first communication module, a first communication, wherein the first communication comprises a first characteristic;
   sending, from a portable electronic device having a camera, a confirmation signal;
   receiving, from the circuitry of the portable electronic device, a second communication;
   capturing, using the camera of the portable electronic device, a captured image of at least a portion of the display screen of the first device;
   analyzing the captured image to obtain a captured image characteristic, the captured image characteristic associated with the first characteristic of the first device;
   comparing the captured image characteristic with the first characteristic; and,
   establishing a first connection between the first device and the portable electronic device if the captured image characteristic and the first characteristic are within a predetermined threshold.

19. The method of claim 18, wherein the first characteristic is selected from: the first device's location with respect to a predefined reference point or the first device's location with respect to the portable electronic device.

20. The method of claim 18, wherein the first characteristic is selected from: the first device's size; the size of the display of the display screen of the first device; or the first device's shape.

21. The method of claim 18, wherein the first characteristic is selected from: the first device's Universal Unique Identifier (UUID) or the first device's Service Set Identifier (SSID).

22. The method of claim 18, wherein the first characteristic is selected from: an average luminance of the display screen of the first device displaying a first image; feature point recognition data corresponding to the first image displayed on the display screen of the first device; a color signature of at least a portion of the first image; or a refresh rate of the display screen.

23. The method of claim 18, wherein the first characteristic is an orientation of the camera with respect to the display screen of the first device.

\* \* \* \* \*